United States Patent
Jarrett (10) Patent No.: US 7,210,337 B1
(45) Date of Patent: May 1, 2007

(54) MEMS SENSOR PACKAGE LEAK TEST

(75) Inventor: Mark J. Jarrett, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/163,388

(22) Filed: Oct. 17, 2005

(51) Int. Cl.
    *G01M 3/34* (2006.01)
(52) U.S. Cl. ..................................... 73/49.3
(58) Field of Classification Search ............... 73/1.02, 73/1.37, 1.57, 1.58, 40, 52, 49.2, 49.3
    See application file for complete search history.

(56) References Cited

U.S. PATENT DOCUMENTS

| | | |
|---|---|---|
| 4,608,866 A | 9/1986 | Begquist |
| 4,893,497 A | 1/1990 | Danielson |
| 5,307,139 A | 4/1994 | Tyson, II et al. |
| 5,398,543 A | 3/1995 | Fukushima et al. |
| 5,639,958 A * | 6/1997 | Lange ............... 73/40.5 A |
| 6,286,362 B1 | 9/2001 | Coffman et al. |
| 6,536,260 B2 * | 3/2003 | Williams ............. 73/40 |
| 6,595,040 B1 | 7/2003 | Widt et al. |
| 6,959,583 B2 * | 11/2005 | Platt ................. 73/1.37 |
| 2005/0081605 A1 | 4/2005 | Chin |

OTHER PUBLICATIONS

"Deparment of Defense Test Method Standard Microcircuits," United States of America, Department of Defense, 708 pages, Jun. 18, 2004.
"Deparment of Defense Test Method Standard Semiconductor Devices," United States of America, Department of Defense, 578 pages, Feb. 28, 1995.
Soucy et al., "Aluminum Nitride Chip Carrier for Microelectromechanical Sensor Applications," Proceedings of the 2002 MRS Fall Meeting, vol. 741, 4 pages, 2002.

* cited by examiner

*Primary Examiner*—Hezron Williams
*Assistant Examiner*—John Fitzgerald
(74) *Attorney, Agent, or Firm*—Evan Bundis, Esq.; Armstrong Teasdale LLP (57) ABSTRACT

Methods and apparatus are provided for detecting leaks in a MEMS sensor package, and in particular, a MEMS sensor package that includes an oscillating structure or element that has a Quality (Q) value. The method and apparatus may include measuring the Q value of the MEMS sensor at a first time, applying a pressure to the outside of the MEMS sensor package, and measuring the Q value of the MEMS sensor at a second time after pressure has been applied for a period of time. A change in the measured Q values between the first time and the second time may be determined, which may then be correlated to a leak rate for the particular MEMS sensor package. In some cases, a leak rate of $2 \times 10^{-13}$ He atm.cc/s or less may be detected.

26 Claims, 7 Drawing Sheets

MEMS SENSOR PACKAGE LEAK TEST

FIELD

The present invention relates generally to micro-electromechanical systems (MEMS) sensors, and more particularly, to methods and systems for detecting leaks in packages that house a MEMS sensor that includes a mechanical oscillator element.

BACKGROUND

Many MEMS sensors include a mechanical oscillator element. For example, MEMS gyroscope and/or accelerometer type sensors often include one or more proof masses, tuning forks or other oscillating structures that are electrostatically driven at a resonance frequency. Movements of the sensor housing, such as rotational movement, lateral movement, acceleration, or other movement can then be detected by sensing certain behavior in the oscillating structure. For example, the oscillating structure may move in a direction that is perpendicular to the oscillating direction due to externally applied forces, such as coriolis forces, acceleration forces, or other forces, depending on the application.

The operational performance characteristics of some MEMS sensors, such as MEMS gyroscope or MEMS accelerometer type sensors, are often related to the resonator Quality value (Q) of the sensor. For example, the start-up time of the mechanical oscillator element, the ring-down time, the sensitivity of the sensor, as well as other performance characteristics are often affected by the Q value of the sensor. The Q value of the sensor is dependent on a number of factors, including the overall sensor design.

Known dampening mechanisms within the sensor can affect the Q value of the sensor. One known dampening mechanism is dependent on the energy lost due to collisions of the mechanical oscillator element with gas molecules within the sensor cavity of the sensor package. To reduce this dampening mechanism, and to obtain higher Q values, such sensors are often packaged in a sensor cavity that is under low pressure. Such sensor packages are often referred to as vacuum packages, even though an absolute vacuum may not be used.

The packages for many MEMS sensors often do not have perfect seals, which results in gas leakage into or out of the sensor cavity. Over time, these leaks can change the internal package pressure, and thus may affect the Q value of the sensor. In some cases, a relatively small leak can cause a relatively large change in pressure in the sensor cavity, particularly over long periods of time. For some applications, this can cause the sensor to cease to operate in accordance with required design parameters after a certain period of time.

Recently, there has been an increased demand for MEMS sensors that have an extended useful life, such as 15 to 20 years. For these and other applications, a MEMS sensor must have a small enough leak rate so that the pressure in the sensor cavity does not exceed some pressure limit over the expected lifetime of the sensor. Currently, conventional methods for testing leak rates of sensor packages are in the $5 \times 10^{-12}$ He atm.cc/s range, which is often not sensitive enough to test sensor packages with expected lifetimes of 15 to 20 years. Therefore, there is need for improved methods and systems for detecting leaks in packages that house MEMS sensors, and in particular, MEMS sensors that have a mechanical oscillating element.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention relates generally to MEMS sensors, and more particularly, to methods and systems for detecting leaks in packages that house a MEMS sensor that includes a mechanical oscillator element. In one illustrative embodiment, a method for detecting a leak in a MEMS sensor package includes measuring a packaged MEMS sensor parameter, such as the Q value, at a first time, inserting the packaged MEMS sensor into a pressure chamber, pressurizing the chamber (e.g. with a positive or negative pressure) for a period of time, and then measuring the packaged MEMS sensor parameter at a second time.

The method may further include determining a change in the measured sensor parameter from the first time to the second time, and comparing the change in the sensor parameter to a predetermined value or range of values. A greater change in the sensor parameter may indicate that the MEMS package does not meet vacuum integrity requirements. In some cases, the sensor parameter may be dependent on the pressure in the MEMS sensor package, such as the Q value of the packaged MEMS sensor.

In some cases, the chamber may be pressurized before the sensor parameter is measured at the first time. Also, the chamber may be depressurized before the sensor parameter is measured at the second time, or the pressure in the chamber may be maintained while the sensor parameter is measured at the second time. The pressure leak detected in the illustrative method may be less than, for example, $5 \times 10^{-12}$ He atm.cc/s.

In another illustrative embodiment, an apparatus for testing the leak rate of a MEMS sensor package may include a MEMS sensor situated in a MEMS sensor package, a chamber defined by chamber walls that are sized to house the MEMS sensor package, a pump for pressurizing the chamber (e.g. with a positive or negative pressure). The apparatus may further include a controller for measuring the sensor parameter of the MEMS sensor at a first time and at a second time, where the measurements are spaced over a period of time. The controller may detect a change in the sensor parameter from the first time to the second time, and such change may indicate if the MEMS sensor package meets certain vacuum integrity requirements. In some cases, the sensor parameter may be the Q value of the MEMS sensor.

BRIEF DESCRIPTION

DETAILED DESCRIPTION

The following description should be read with reference to the drawings wherein like reference numerals indicate like elements throughout the several views. The detailed description and drawings show several embodiments, which are meant to be illustrative of the claimed invention.

In some applications, it is desirable to provide a MEMS sensor with an expected useful life in the range of 10 to 20 years, or greater. MEMS sensors for the automotive industry may be one such application. To have a relatively long life, a MEMS sensor package must typically maintain a pressure limit in a sensor cavity over the expected useful lifetime of the MEMS sensor. For example, and in one application, the pressure in the sensor cavity must be less than 47 mTorr over the expected lifetime of the MEMs sensor. Other applications may have higher or lower pressure limits for the MEMS sensor package, as desired. In one case, the MEMS sensor package may have a sensor cavity with a volume of 0.1420 cubic centimeters (cc). The illustrative MEMS sensor may occupy some of the volume of the MEMS sensor package, thus, the free volume of the MEMS sensor package may be less than the total volume. In one case, the remaining free volume of the MEMS sensor package may be 0.1305 cc. Thus, with this free volume, and in some cases, for a MEMS sensor to have a relatively long life of 15 to 20 years, the leak rate of the MEMS sensor package may need to be $2 \times 10^{-13}$ He atm.cc/s or less.

To help extend the lifetime of the MEMS sensor, the MEMS sensor package may also include a getter, however, this is not required. The getter may absorb residual non-inert gas in the MEMS sensor package and/or non-inert gases that leak into the MEMS sensor package over time. This may help extend the life of the MEMS sensor by reducing the pressure change inside the sensor cavity of the MEMS sensor package. In some cases, the getter may be activated by heat.

Figure 1:
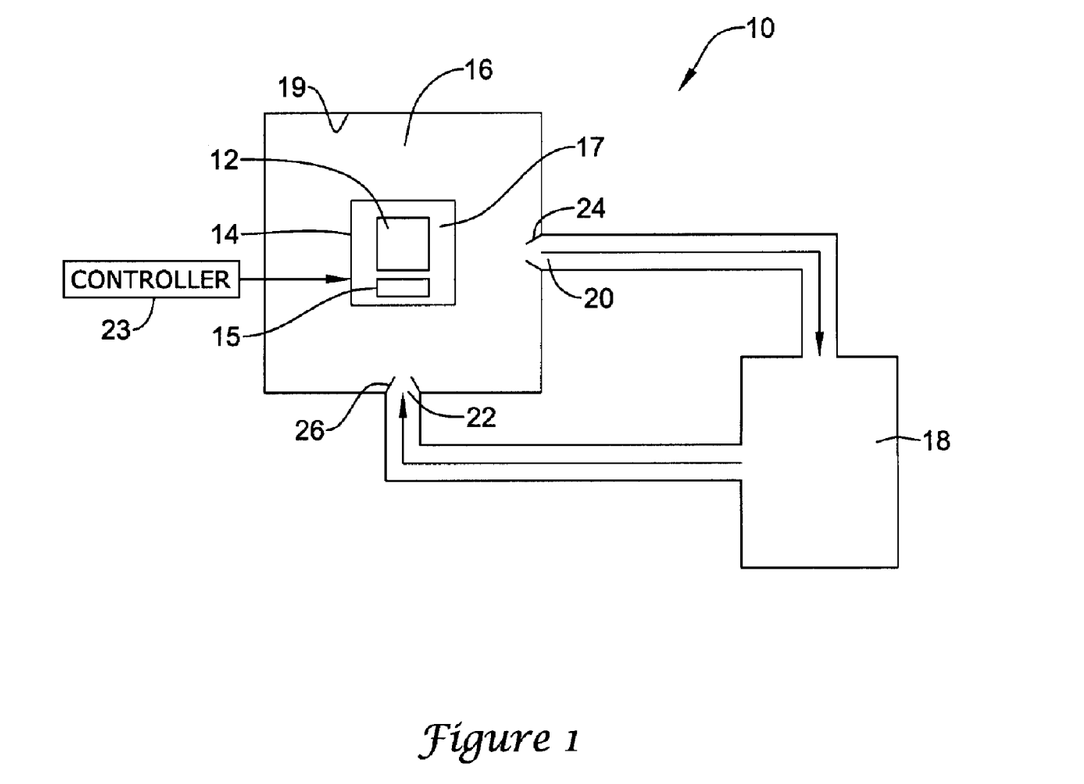
FIG. 1 is a schematic diagram of an illustrative embodiment of an apparatus for testing the leak rate of a MEMS sensor.

FIG. 1 is a schematic diagram of an illustrative embodiment of an apparatus 10 for testing the leak rate of a MEMS sensor package 14. The illustrative apparatus 10 includes a MEMS sensor 12 situated in a cavity 17 of the MEMS sensor package 14. The MEMS sensor package 14 is shown positioned in a pressure chamber 16, which is defined by chamber walls 19. The chamber 16 may be pressurized with a gas to a desired pressure using, for example, a pump 18. The pump 18 may be a mechanical pump, a gas cylinder, an evacuated container or any other suitable device or pressure source that can change the pressure in the pressure chamber 16. In some cases, the pressure may be a pressure above atmospheric pressure, while in other cases, the pressure may be a pressure below atmospheric pressure.

The MEMS sensor 12 may be packaged and sealed in the sensor cavity 17 of the MEMS sensor package 14, sometimes under a negative pressure. A getter 15 may also be provided in the sensor cavity 17, but this is not required. In some cases, the MEMS sensor package 14 and/or seal may include some small leaks. To detect the magnitude of these leaks, if present, the MEMS sensor package 14 may be situated in the chamber 16. The chamber 16 may be defined by chamber walls 19, which may define a chamber space that is at least sufficiently large to hold the MEMS sensor package 14. The chamber 16 may then be pressurized via pump 18, either positively or negatively, depending on the application. In some cases, the chamber 16 is pressurized with a pressure of gas.

The chamber 16 may have an inlet port 22 and/or an outlet port 24 to facilitate the pressurization, and depressurization if desired, of the chamber 16. In some cases, there may be a valve 24 situated in fluid communication with the inlet port 22 and/or a valve 26 situated in fluid communication with the outlet port 24 to help seal the chamber 16 during testing of the MEMS sensor package 14. Additionally, in some cases, the chamber 16 may have a cover member or door (not shown). The cover member or door may allow the inserting and removing of the MEMS sensor package 14 from the chamber 16. More generally, it is contemplated that any suitable chamber 16 that is capable of pressurizing the space around a MEMS sensor package 14 may be used, as desired. In many cases, the sensor cavity 17 of the MEMS sensor package 14 is back-filled to some degree with an inert gas such as helium and/or argon. An inert gas is often used because the getter 15, when provided, may absorb non-inert gas. In some cases, the chamber 16 is positively pressurized by pumping a gas, such as an inert gas, into the chamber 16. More generally, however, it is contemplated that any suitable gas may be used to positively pressurize the chamber 16, as desired.

The MEMS sensor 12 may be any type of MEMS sensor. In some cases, the MEMS sensor 12 includes a mechanical oscillator element. For example, the MEMS sensor 12 may be a gyroscope and/or accelerometer type sensor, and may include one or more proof masses, tuning forks or other oscillating structures that are electrostatically driven at a resonance frequency. In some cases, the MEMS sensor 12 may have a quality value (Q), which is dependant on the pressure in the cavity 17 of the MEMS sensor package 14.

Known dampening mechanisms within the MEMS sensor 12 and/or MEMS sensor package 14 can affect the Q value of the sensor. One known dampening mechanism is dependent on the energy lost due to collisions of the mechanical oscillator element of the MEMS sensor 12 with gas molecules within the sensor cavity 17 of the MEMS sensor package 14. To reduce this dampening mechanism, and to obtain higher Q values, such MEMS sensors 12 are often packaged in a sensor cavity 17 that is under low pressure. Such MEMS sensor packages 14 are often referred to as vacuum packages, even though an absolute vacuum may not be used.

As noted above, the MEMS sensor package 14 may not have a perfect seal, which may result in gas leakage into or out of the sensor cavity 17. Over time, these leaks can change the internal package pressure in the sensor cavity 17 over time, and thus may affect the Q value of the MEMS sensor 12. In some cases, a relatively small leak can cause a relatively large change in pressure in the sensor cavity 17, particularly over long periods of time. For some applications, this can cause the MEMS sensor 12 to cease to operate in accordance with required design parameters after a certain period of time.

The Q value may be related to many performance characteristics of the MEMS sensor 12, such as, for example, the sensitivity of the MEMS sensor 12, the ring-down time of the mechanical oscillator element, the start-up time of the mechanical oscillator element, as well as others. For certain applications, it may be desirable to have a desired Q value that provides a specific performance characteristic for the MEMS sensor 12, often depending on the application. Thus, a desired pressure or pressure range in the sensor cavity 17 over the expected lifetime of the MEMS sensor 12 may be desirable.

A controller 23 may be provided, and may be electrically coupled to the MEMS sensor package 14. The controller may be capable of controlling the MEMS sensor 12, at least sufficiently to determine a sensor parameter such as the "Q" value of the MEMS sensor 12. In some cases, the controller 23 may measure the Q value of the MEMS sensor at a first time. After pressure has been applied for a period of time to the exterior of the MEMS sensor package via the pressurized chamber 16, the controller 23 may again measure the Q value of the MEMS sensor at a second time. A change in the measured Q values between the first time and the second time may indicate a leak, and the magnitude of the change in Q value may be correlated to a leak rate for the particular MEMS sensor package. In some cases, a leak rate of $2 \times 10^{-13}$ He atm.cc/s or less may be detected using this technique.

Figure 2:
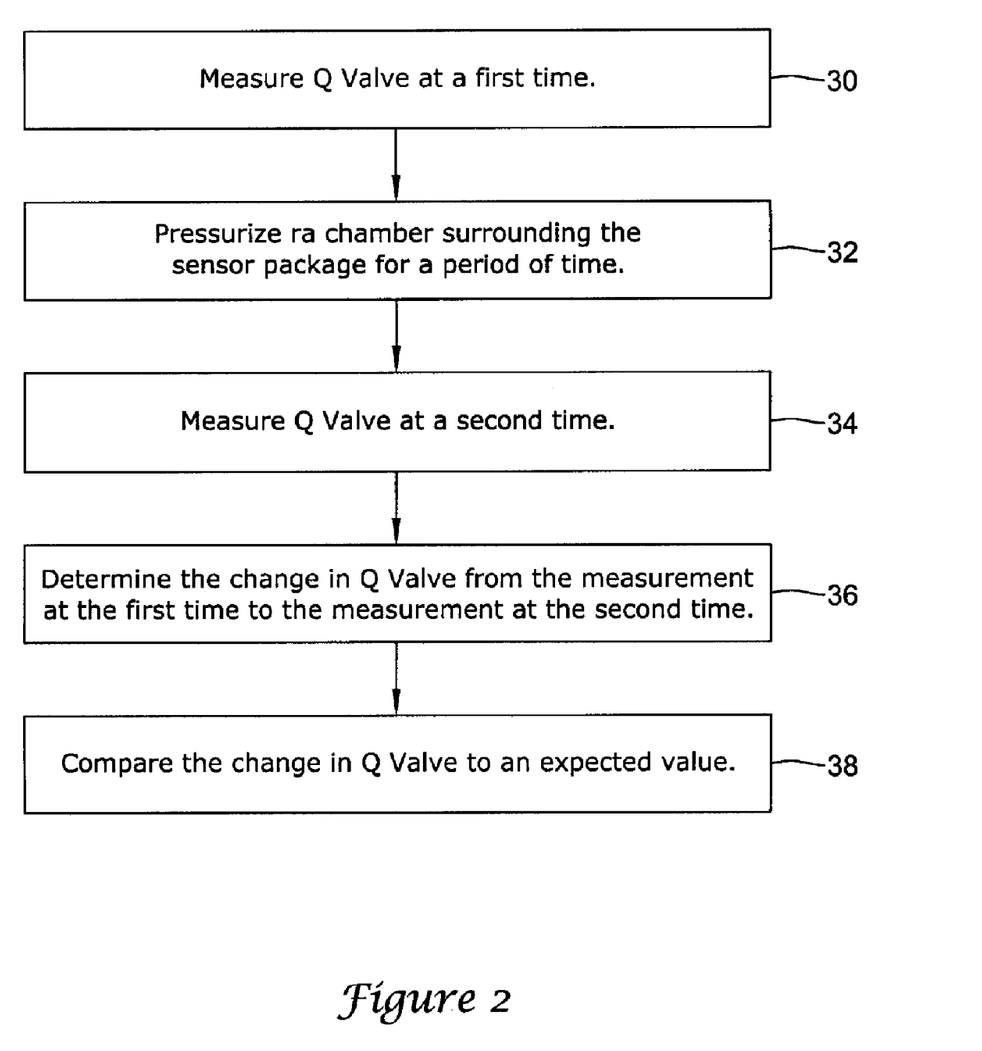
FIG. 2 is a flow diagram of an illustrative method for detecting a leak in a MEMS sensor package.

FIG. 2 is a flow diagram of an illustrative method for detecting a leak in a MEMS sensor package. In some applications, such as, for example, the automotive, space, aeronautic and other industries, there may be a desire for MEMS sensors to have an expected lifetime of between 15 and 20 years or more. To have this relatively long life, the MEMS sensor package 14 must typically prevent the pressure in the sensor cavity 17 from falling outside some pressure limit or range. For example, for some MEMS gyroscope sensors, the pressure inside the sensor cavity 17 should not exceed some pressure limit, such as, for example, 47 mTorr. It has been found that the illustrative method for detecting MEMS sensor package leaks may be able to detect relatively small leaks, such as, for example, $2 \times 10^{-13}$ He atm.cc/s, or less. In some cases, these relatively small leaks may, over time, increase the pressure in the sensor cavity 17 of the MEMS sensor package 14 to a pressure that is greater than the designated pressure limit (e.g. 47 mTorr or higher). Being able to detect these relatively small leaks, such as, leaks of $2 \times 10^{-13}$ He atm.cc/s, may help determine in advance the expected lifetime of particular MEMS sensors.

Being able to determine in advance the expected lifetime of particular MEMS sensors may allow the MEMS sensors to be binned or otherwise sorted. In some cases, MEMS sensors with shorter expected lifetimes may be used or sold in applications that require shorter lifetimes, while MEMS sensors with longer expected lifetimes may be used or sold in applications that require longer lifetimes. In some cases, this may increase the effective yield of the MEMS sensors that are produced.

To detect leaks in the MEMS sensor package 14, a sensor parameter of the MEMS sensor 12 that is housed by the MEMS sensor package 14 may be used. One illustrative sensor parameter may be the Q value of the MEMS sensor 12, as discussed above. As shown at step 30 of FIG. 2, the sensor parameter (e.g. Q value) may be measured at a first time. When the Q value is used, it is contemplated that the Q value may be measured using any suitable technique, including measuring the ring-down time, the start-up time, or any other suitable parameter of the MEMS sensor 12, as desired. Next, and as shown at step 32, the MEMS sensor package 14 may be placed in a chamber 16, and the chamber 16 may be pressurized for a period of time. When the pressure inside the sensor cavity 17 of the MEMS sensor package 14 is low, the chamber 16 may be pressurized in a positive direction relative to atmosphere, thereby creating a greater pressure gradient across the MEMS sensor package 14. This will tend to temporarily increase the leak rate, if any, into the sensor cavity 17. In some cases, the gas used to pressurize cavity 16 around the MEMS sensor package 14 may be a non-inert gas, as discussed previously.

In some cases, the period of time that the MEMS sensor package 14 is pressurized is in the range of 2 to 120 hours, but other times may also be used, depending on the circumstances. It is contemplated the MEMS sensor parameter (e.g. Q value) may be measured at the first time before the chamber 16 is pressurized, after the chamber 16 is pressurized, during the pressurization, or at any other time, as desired.

After a time period has elapsed following the first measurement time, and after the MEMS sensor package 14 has been pressurized in the chamber 16 for a period of time, the MEMS sensor parameter (e.g. Q value) may again be measured at a second measurement time, as shown at step 34. The MEMS sensor parameter (e.g. Q value) may be measured using the same method as at the first measurement time, if desired. In some cases, the cavity 16 may be depressurized prior to the measuring the sensor parameter at the second measurement time. In other cases, the cavity 16 may be maintained at an elevated pressurize level when measuring the sensor parameter at the second measurement time.

Next, and as shown at step 36, a change in the MEMS sensor parameter from the measurement at the first time to the measurement at the second time may be determined. The change in the MEMS sensor parameter may relate or correspond to a change in the pressure in the sensor cavity 17 of the MEMS sensor package 14. In some cases, the detected change in the sensor parameter may be compared to an expected value for acceptable leak rates, as shown in step 38. A change in the MEMS sensor package pressure that is greater than that expected by an acceptable leak rate may indicate that the MEMS sensor package 14 does not meet the vacuum integrity requirement for the desired lifetime of the MEMS sensor.

In some cases, prior to measuring the sensor parameter at the first measurement time, the MEMS sensor package 14 may be set aside for a period of time. Once the period of time has elapsed, the MEMS sensor parameter may be measured at the first measurement time, and the measured sensor parameter (e.g. Q value) may be used to detect relatively gross leak rates in the MEMS sensor package 14. In some cases, a Q value that is relatively low may be used to detect gross leak rates in the MEMS sensor package. The MEMS sensor package 14 may be set aside, or in some cases "quarantined", in a pressurized chamber, or at atmosphere, depending on the circumstances.

Figure 3:
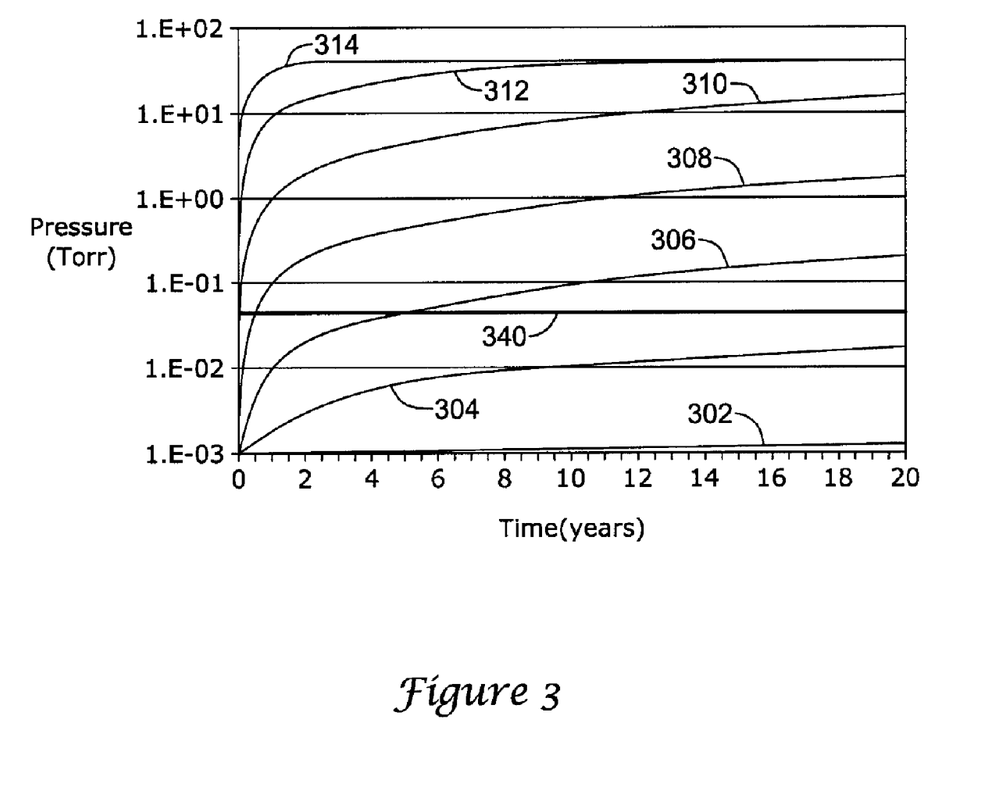
FIG. 3 is a graph showing illustrative pressure rises in a MEMS sensor package over time at various leak rates.

FIG. 3 is a graph showing illustrative pressure rises in a MEMS sensor package 14 over time at various leak rates. The illustrative graph shows the MEMS internal inert gas pressure in the sensor cavity 17 for various leak rates. The initial residual pressure in the sensor cavity after fabrication was assumed to be 1 mTorr. There are seven leak rates shown on the graph, ranging from $1 \times 10^{-8}$ He atm.cc/s to $1 \times 10^{-15}$ He atm.cc/s. Line 302 shows a leak rate of $1 \times 10^{-15}$ He atm.cc/s. Line 304 shows a leak rate of $1 \times 10^{-13}$ He atm.cc/s. Line 306 shows a leak rate of $1 \times 10^{-12}$ He atm.cc/s. Line 308 shows a leak rate of $1 \times 10^{-11}$ He atm.cc/s. Line 310 shows a leak rate of $1 \times 10^{-10}$ He atm.cc/s. Line 312 shows a leak rate of $1 \times 10^{-9}$ He atm.cc/s. Line 314 shows a leak rate of $1 \times 10^{-8}$ He atm.cc/s.

As illustrated, initially, the illustrative leak rates may cause a relatively large percentage change in the MEMS sensor package pressure. Over time, such as from 10 to 20 years, the pressure change or pressure curves flatten out, and the percentage change in pressure in the MEMS sensor package is relatively smaller. Line 340 shows a pressure limit of 47 mTorr, which is one illustrative maximum pressure limit for the cavity 17 of a MEMS sensor package 14 in order for the MEMS sensor 12 to operate properly. Thus, and using this pressure limit, the expected lifetime of the MEMS sensor 12 is indicated by when the leak rate line crosses the pressure limit line shown at 340. As can be seen, leak rate lines 302 and 304 are always less than pressure limit line 340, and thus are acceptable leak rates and the MEMS sensor package 14.

From the illustrative graph, the highest leak rate that will result in an expected sensor lifetime of 20 years is about $2 \times 10^{-13}$ He atm.cc/s. However, due to the uncertainty in the residual pressure of the MEMS sensor package after fabrication, which may be anywhere between 1 mTorr up to 10 mTorr, and because the maximum pressure limit (maximum pressure allowable) may range from anywhere from 20 mTorr to 47 mTorr, the leak limit may be anywhere between $2 \times 10^{-13}$ He atm.cc/s to $2 \times 10^{-14}$ He atm.cc/s in the illustrative case.

Commercial helium leak detectors are not capable of finding these leaks, even when using a helium bomb test method. In a typical helium bomb test, the sensor package is placed in a container that is pressurized with helium at about two atmospheres or higher. After a set time (usually 4 to 12 hours), the sensor package is removed from the bomb and placed in a leak detector canister. The total helium in the canister is then measured and compared with a calculated signal for the leak specification limit. Because the leak rate is a throughput measurement and dependent on pressure difference, the leak detector signal for a given leak rate may be given by the equation:

$$R = \frac{LP_E}{P_O}(1 - e^{-Lt_1/VP_O})e^{-Lt_2/VP_O}$$

where:
R is the leak signal in He atm.cc/s
L is the actual helium leak rate in He atm.cc/s
$P_E$ is the helium exposure pressure in atmospheres
$P_O$ is the atmospheric pressure in atmospheres
V is the package volume in cc
$t_1$ is the helium exposure time in seconds
$t_2$ is the dwell time after release in pressure in seconds.

Figure 4:
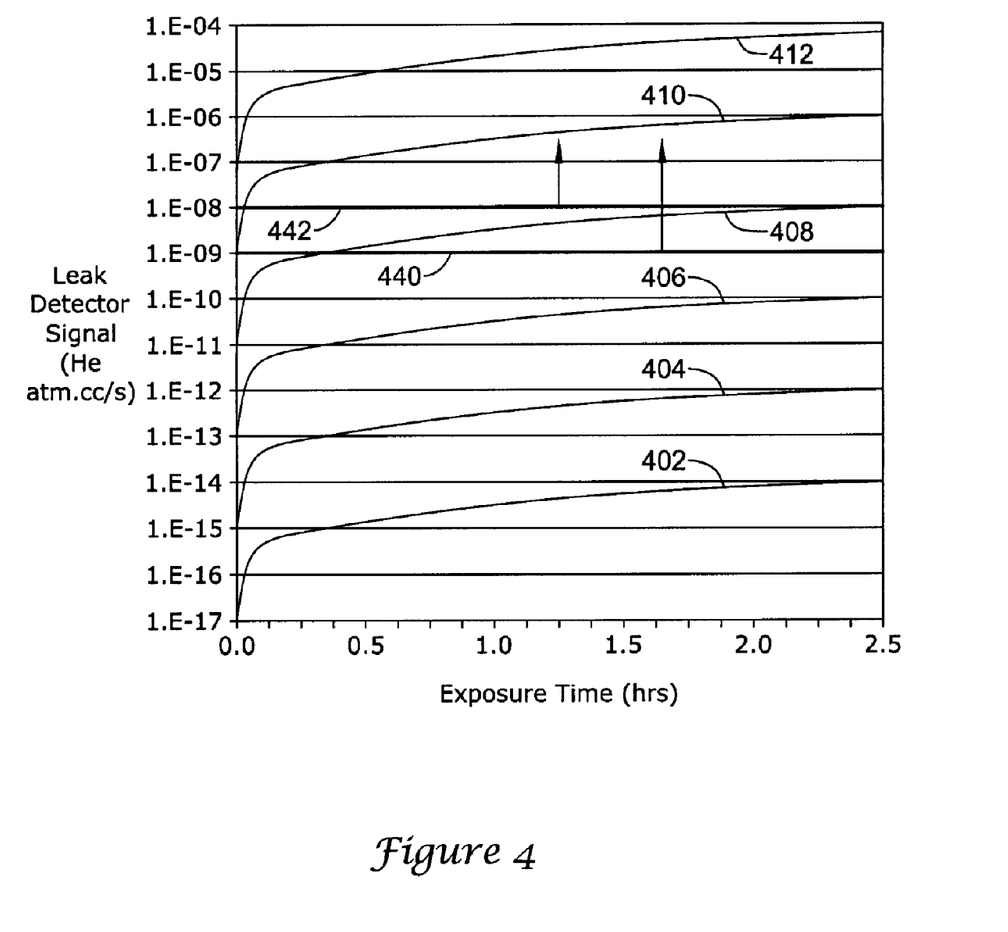
FIG. 4 is a graph showing predicted leak detector signals for a MEMS sensor package over time at various leak rates during a helium bomb test.

A graph of this equation for various leak rates L and exposure times $t_1$ is shown in FIG. 4. Line 402 shows a leak detector signal that corresponds to a leak rate of $1 \times 10^{-10}$ He atm.cc/s. Line 404 shows a leak detector signal that corresponds to a leak rate of $1 \times 10^{-9}$ He atm.cc/s. Line 406 shows a leak detector signal that corresponds to a leak rate of $1 \times 10^{-8}$ He atm.cc/s. Line 408 shows a leak detector signal that corresponds to a leak rate of $1 \times 10^{-7}$ He atm.cc/s. Line 410 shows a leak detector signal that corresponds to a leak rate of $1 \times 10^{-6}$ He atm.cc/s. Finally, line 412 shows a leak detector signal that corresponds to a leak rate of $1 \times 10^{-5}$ He atm.cc/s.

In a controlled lab environment, the smallest leak signal that could be observed using a canister test is about $1 \times 10^{-9}$ He atm.cc/s, shown at line 440. However, the background noise would most likely be higher in a production environment, so a reasonable leak detector signal that could be observed in production may be about $1 \times 10^{-8}$ He atm.cc/s, shown at line 442. In either case, a leak of $1 \times 10^{-8}$ He atm.cc/s cannot be detected in a reasonable amount of time. This can be explained by considering the amount of helium entering a sensor package during helium bombing. Because partial pressure difference is what drives the movement of helium through the leak, more helium can get into the package cavity over a short time (e.g. 200 psi difference) than can get out (e.g. less than 1 mTorr difference). Thus, to detect a leak of $2 \times 10^{-13}$ He atm.cc/s, a leak detector capable of detecting $1 \times 10^{-18}$ He atm.cc/s may be needed and currently, the best commercial helium detectors are rated only for about $5 \times 10^{-12}$ He atm.cc/s. This illustrates the short comings of the conventional helium bomb test.

Figure 5:
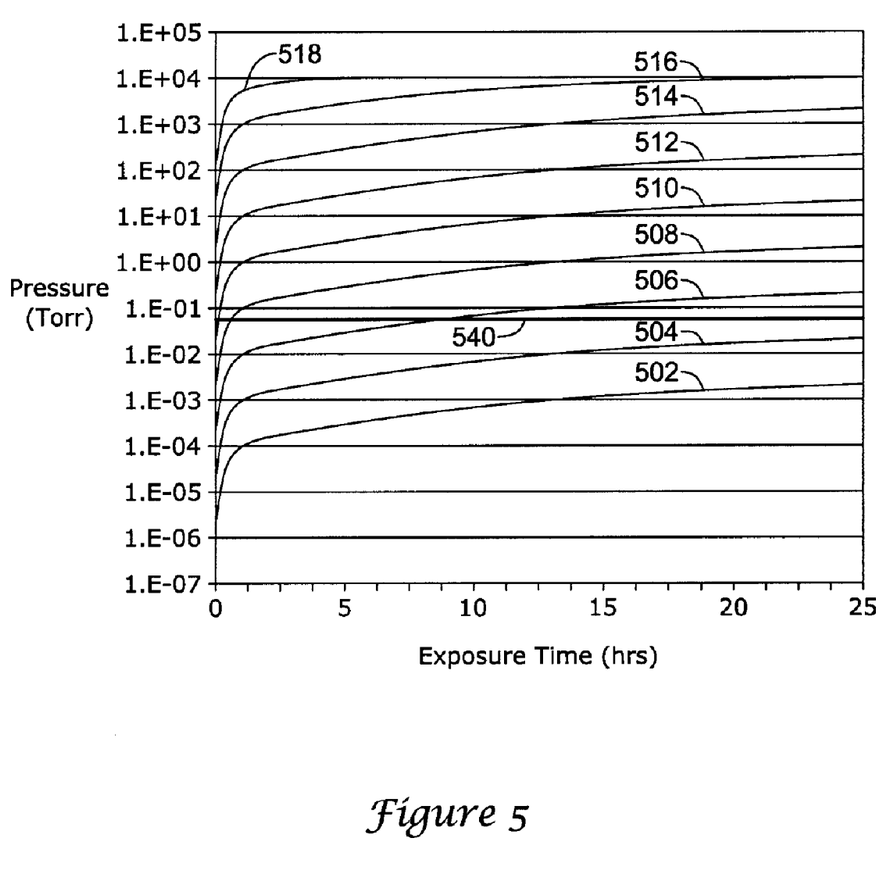
FIG. 5 is a graph showing illustrative pressure rises inside a MEMS sensor package for various leak rates when exposed to a pressurized container or chamber (e.g. during a helium bomb test)

FIG. 5 is a graph showing illustrative pressure rises inside a MEMS sensor package for various leak rates when exposed to a pressurized container or chamber (e.g. during a helium bomb test). In the illustrative graph, a MEMS sensor package 14 is exposed to 200 psig of helium for a period of time. As depicted in the graph, there are multiple leak rates ranging from $1 \times 10^{-13}$ He atm.cc/s to $1 \times 10^{-5}$ He atm.cc/s. Line 502 corresponds to a leak rate of $1 \times 10^{-13}$ He atm.cc/s. Line 504 corresponds to a leak rate of $1 \times 10^{-12}$ He atm.cc/s. Line 506 corresponds to a leak rate of $1 \times 10^{-11}$ He atm.cc/s. Line 508 corresponds to a leak rate of $1 \times 10^{-10}$ He atm.cc/s. Line 510 corresponds to a leak rate of $1 \times 10^{-9}$ He atm.cc/s. Line 512 corresponds to a leak rate of $1 \times 10^{-8}$ He atm.cc/s. Line 514 corresponds to a leak rate of $1 \times 10^{-7}$ He atm.cc/s. Line 516 corresponds to a leak rate of $1 \times 10^{-6}$ He atm.cc/s. Line 518 corresponds to a leak rate of $1 \times 10^{-5}$ He atm.cc/s. The pressure limit of the MEMS sensor package 14 in the illustrative graph is shown at 47 mTorr, as shown by line 540.

Figure 6:
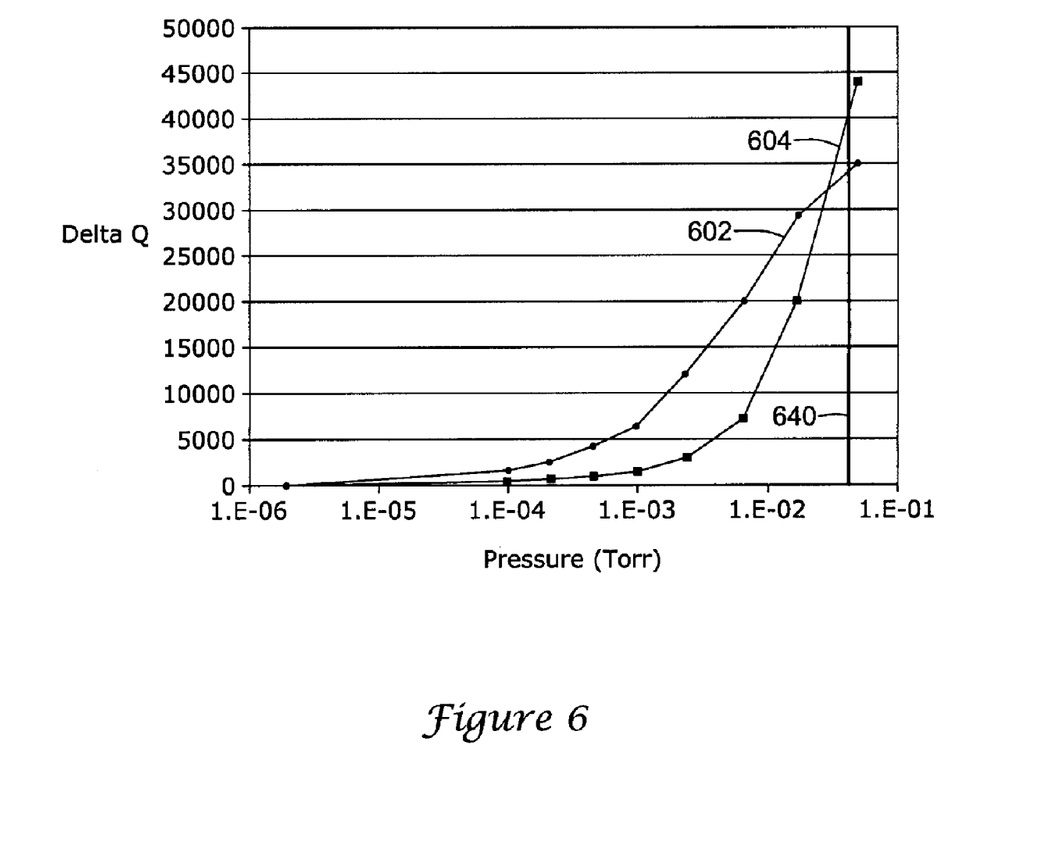
FIG. 6 is a graph showing the change in motor Q value and sensor Q value as a function of the package pressure for an actual MEMS gyro sensor.

The Q value for a MEMS sensor having an oscillating structure or element is dependent on the pressure in the cavity that houses the MEMS sensor. FIG. 6 is a graph showing the change in motor Q value and sensor Q value as a function of the package pressure for an actual MEMS gyro sensor. The sensor Q value represents the sensitivity of the sensor, while the motor Q value represents the Q value of the oscillating structure as it is driven. The graph shows the change in motor Q at line 604 and the change in sensor Q at line 602.

As can be seen, as the pressure in the cavity 17 of the MEMS sensor package 14 increases, the change in the respective Q values also increase. Furthermore, the illustrative pressure limit of 47 mTorr is shown at line 640. In the illustrative case, the total change in Q value if the pressure limit is reached is in the range of 35,000 to 45,000.

The repeatability of the Q value measurements is about 0.2%, so a pressure change near 1 mTorr is needed for a substantial measurable Q shift. A 1 mTorr change in pressure in the sensor cavity 17 of a MEMS sensor package 14 may require the following bomb conditions:

| Bomb Pressure | Time to 1 mTorr with Package 2E-13 Leak |
| --- | --- |
| 2 atm (14.7 psig) | 116 hours |
| 3 atm (29.4 psig) | 78 hours |
| 4 atm (44.1 psig) | 58 hours |
| 5 atm (58.8 psig) | 47 hours |
| 6 atm (73.5 psig) | 39 hours |
| 14.6 atm (200 psig) | 16 hours |

As can be seen, a substantial shift in Q value may be detected after bombing for only 16 hours at 200 psig if the MEMS sensor package had a 2E-13 He atm.cc/s leak rate.

In some cases, and prior to measuring a sensor parameter (e.g. Q value) at a first measurement time, the MEMS sensor package 14 may be set aside for a period of time. Once the period of time has elapsed, the MEMS sensor parameter may be measured at the first measurement time, and the measured sensor parameter (e.g. Q value) may be used to detect a relatively gross leak rate in the MEMS sensor package 14. In some cases, the MEMS sensor package 14 may be set aside, or in some cases "quarantined", in a pressurized chamber, or at atmosphere, depending on the circumstances.

Figure 7:
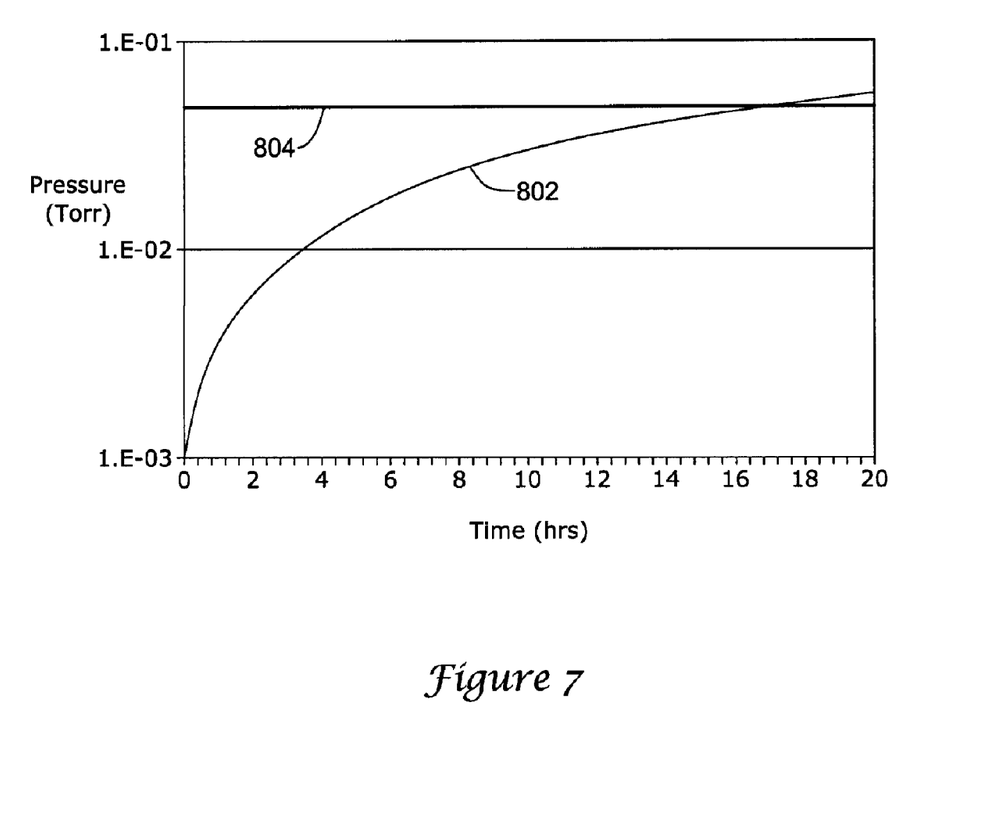
FIG. 7 is a graph showing the change in pressure in an illustrative MEMS sensor package over a period of time.

FIG. 7 is a graph showing the change in pressure in an illustrative MEMS sensor package over a period of time. As discussed previously, gross leaks may be detected by setting aside the MEMS sensor package 14 for a period of time prior to measuring the Q value at the first time. In the illustrative graph, the MEMS sensor package 14 is placed in a chamber 16 and pressurized with 200 psig of helium. The change in pressure is shown at line 802, and a pressure limit of 47 mTorr is shown at line 804. If the illustrative MEMS sensor package has a getter, and the getter is activated so there is only inert gas in the sensor cavity 17, the pressure in the sensor cavity 17 may exceed 47 mTorr in 18 hours if it has a $4.2 \times 10^{-8}$ He atm.cc/s leak rate. If the MEMS sensor package does not have a getter, or the getter is not active, then the pressure in the sensor cavity 17 may exceed 47 mTorr in 18 hours if it has a $3.4 \times 10^{-10}$ He atm.cc/s leak rate.

It is contemplated that the MEMS sensor package 14 may be set aside for a period of time during the manufacturing/assembly/testing process before the Q value is measured at the first or subsequent time. That is, the MEMS sensor package 14 may be provided on a shelf, inserted into a pressure chamber, or otherwise stored for a period of time during the manufacturing/assembly/testing process, before the Q value is measured at the first or subsequent time. Alternatively, or in addition, the MEMS sensor package 14 may be shipped and used for a period of time, before measuring the Q value at the first or subsequent time. In this latter case, a leak test may be performed in the field, which may help check the seal integrity of fielded devices, which may provide some insight during failure analysis testing. A reason to wait for a period of time before measuring the Q value at the first or subsequent time may be to allow an increased pressure change inside the MEMS sensor package 14, which may be easier to detect. Smaller leak rates than that shown in FIG. 7 may be detected in older sensors.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for detecting a leak in a MEMS sensor package, wherein the MEMS sensor package includes a sensor cavity that encloses a MEMS sensor, wherein the MEMS sensor includes a mechanical oscillating element with a Quality (Q) value, the method comprising:

measuring a first Q value of the MEMS sensor at a first time;
applying a pressure differential between the sensor cavity and the exterior of the MEMS sensor package; and
measuring a second Q value of the MEMS sensor at a second time, wherein the second time is later than the first time.

2. The method of claim 1 wherein the first Q value is measured before the pressure differential is applied.

3. The method of claim 1 wherein the first Q value is measured after the pressure differential is applied.

4. The method of claim 1 wherein the second Q value is measured while the pressure differential is applied.

5. The method of claim 1 further comprising the step of removing the pressure differential between the sensor cavity and the exterior of the MEMS sensor package, and wherein the second Q value is measured after the pressure differential is removed.

6. The method of claim 1 wherein the differential pressure applying step includes the steps of:
inserting the MEMS sensor into a chamber; and
pressurizing the chamber with a gas for a period of time.

7. The method of claim 1 wherein the pressure differential applied by the applying step is less than 200 psig.

8. The method of claim 1 wherein the pressure differential applied by the applying step is less than 100 psig.

9. The method of claim 1 wherein the pressure differential applied by the applying step is less than 50 psig.

10. The method of claim 1 wherein the pressure differential applied by the applying step is less than 20 psig.

11. The method of claim 1 wherein the leak detected is less than $5 \times 10^{-12}$ He atm.cc/s.

12. The method of claim 1 further comprising:
determining a delta 0 value, which is the difference between the first Q value and the second Q value; and
comparing the delta Q value to a predetermined delta Q value or a predetermined range of delta Q values.

13. The method of claim 12 further comprising:
determining that the MEMS sensor package does not meet a vacuum integrity requirement when the delta Q value is greater than the predetermined delta Q value or the predetermined range of delta Q values.

14. The method of claim 1 wherein the second Q value is measured after the pressure differential between the sensor cavity and the exterior of the MEMS sensor package has been applied for a period of time.

15. The method of claim 14 wherein the period of time is less than 100 hours.

16. The method of claim 14 wherein the period of time is less than 50 hours.

17. The method of claim 14 wherein the period of time is less than 20 hours.

18. A method for detecting a leak in a MEMS sensor package, wherein the MEMS sensor package includes a sensor cavity that encloses a MEMS sensor, wherein the MEMS sensor includes a mechanical oscillating element with a Quality (Q) value, the method comprising:
waiting for a period of time;
measuring the Q value of the MEMS sensor; and
using the measured Q value to determine if the MEMS sensor package has an unacceptable leak rate.

19. The method of claim 18 wherein the period of time is greater than 10 hours.

20. The method of claim 18 wherein the period of time is greater than 15 hours.

21. The method of claim 18 wherein the period of time is greater than 20 hours.

22. The method of claim 18 further comprising:
measuring the Q value of the MEMS sensor at two or more different times; and using two or more of the measured Q values to determine if the MEMS sensor package has an unacceptable leak rate.

23. The method of claim 18 further comprising the step of putting the MEMS sensor package into a pressure chamber, and pressurizing the pressure chamber, prior to the waiting step.

24. The method of claim 23 wherein the pressurized chamber is pressurized with an inert gas.

25. The method of claim 23 wherein the pressurized chamber is pressurized to greater than 100 psig.

26. The method of claim 23 wherein the pressurized chamber is pressurized to greater than 100 psig for more than 10 hours.

* * * * *